(No Model.)   C. G. O. BARR.   11 Sheets—Sheet 2.
APPARATUS FOR PRODUCING MOTIVE POWER, &c., BY MEANS OF HEAT OF THE SUN.

No. 561,755.   Patented June 9, 1896.

Fig. 1.

(No Model.) 11 Sheets—Sheet 7.

C. G. O. BARR.
APPARATUS FOR PRODUCING MOTIVE POWER, &c., BY MEANS OF HEAT OF THE SUN.

No. 561,755. Patented June 9, 1896.

Witnesses
Chas H. Smith
J. Staib

Inventor
Carl G. O. Barr
per Lemuel W. Serrell
Atty.

(No Model.) 11 Sheets—Sheet 8.
C. G. O. BARR.
APPARATUS FOR PRODUCING MOTIVE POWER, &c., BY MEANS OF HEAT OF THE SUN.

No. 561,755. Patented June 9, 1896.

Witnesses
Chas. H. Smith
J. Staib

Inventor
Carl G. O. Barr
per Lemuel W. Serrell
Atty (No Model.) 11 Sheets—Sheet 9.
C. G. O. BARR.
APPARATUS FOR PRODUCING MOTIVE POWER, &c., BY MEANS OF HEAT OF THE SUN.

No. 561,755. Patented June 9, 1896.

Witnesses
Chas H. Smith
J. Staib

Inventor
Carl G. O. Barr
per Lemuel W. Serrell
Atty.

(No Model.) 11 Sheets—Sheet 10.

C. G. O. BARR.
APPARATUS FOR PRODUCING MOTIVE POWER, &c., BY MEANS OF HEAT OF THE SUN.

No. 561,755. Patented June 9, 1896.

(No Model.) 11 Sheets—Sheet 11.
C. G. O. BARR.
APPARATUS FOR PRODUCING MOTIVE POWER, &c., BY MEANS OF HEAT OF THE SUN.

No. 561,755. Patented June 9, 1896.

UNITED STATES PATENT OFFICE.

CARL GOTTFRIED OLSSON BARR, OF MANTORP, SWEDEN.

APPARATUS FOR PRODUCING MOTIVE POWER, &c., BY MEANS OF HEAT OF THE SUN.

SPECIFICATION forming part of Letters Patent No. 561,755, dated June 9, 1896.

Application filed August 9, 1893. Serial No. 482,783. (No model.) Patented in Sweden December 3, 1890, No. 4,353.

*To all whom it may concern:*

Be it known that I, CARL GOTTFRIED OLSSON BARR, a subject of the King of Sweden and Norway, and a resident of Kungsäter, Mantorp, Sweden, have invented certain new and useful Improvements in Apparatus for Producing Motive Power, &c., by Means of the Heat of the Sun, (for which I have obtained a patent in Sweden, No. 4,353, bearing date December 3, 1890,) of which the following is a specification.

The present invention relates to an apparatus in which a fluid—*e. g.*, compressed air, water, &c.—may be heated by the rays of the sun and thus be given greater tension in order to be afterward used as motive power or for other purposes.

The apparatus consists of a horizontal cylindrical boiler movable round a vertical hollow shaft, through which the heated fluid is led away from the boiler. Usually the fluid which is to be heated may also be led in through this shaft. The boiler is supported either by a tank floating in water or other fluid or by a turn-table which revolves once a day by means of clockwork. If the boiler be made very long, its ends and possibly other places may be supported by wheels which run on tracks concentric to the axis of rotation of the boiler. Along the boiler and on each side of it there is a mirror, (or several,) the cross-section of which is in the form of a semiparabola. Both mirrors are so placed relatively to the boiler that their focus-lines are along and on the surface of the boiler or a little within it. The mirrors must also be so mounted that they can be turned round a common axis, which is the longitudinal axis of the boiler. The movement of rotation is imparted to them by clockwork, which partakes in the movement of the boiler and is so regulated that the axis of the parabola is constantly kept directed to the sun during its apparent course above the horizon. Between the mirrors and the clockwork for their rotation round the boiler there is inserted a reversing mechanism, so that when the sun has reached the meridian altitude and apparently begins to descend the movement of the mirrors is reversed. The reversing mechanism also serves at sunset to arrest the movement of the mirrors and at sunrise again set them going. It is actuated automatically by means of adjustable stops, which are placed in a concentric course to the axis of rotation of the boiler and as obstacles for a projecting part connected with the reversing mechanism, which part is affected by the stops and causes the requisite change in the motion of the mirrors.

So as to hasten the formation of steam when water is used as the fluid, in the horizontal axis of the boiler there are tubes or pipes which are movably connected with the feeding-tube and pass out through the end walls of the boiler, and outside the boiler are connected with the mirrors in such a manner that they rotate with them. In the walls of these pipes or tubes there are two rows of holes so arranged that they direct the jets on those parts of the boiler that are most strongly heated.

In ordinary cases the fluid which is to be heated is led, as previously mentioned, through the vertical shaft; but if water be used and the apparatus be supported by a tank floating in water the water may be taken from the surrounding water and be conducted to the boiler by means of pipes, which terminate in a hose or such like, which drags in the water during the rotation of the boiler. The feeding of the water is in this case best carried out by an injector placed in the conduit.

The accompanying drawings show an apparatus arranged according to this invention, but only as an example, and destined to heat water or compressed air or both in conjunction.

Fig. 2 is an end elevation of the same. In these figures the mirrors are turned directly upward. Figs. 5 to 15 are details showing partly the gearings for the turning of the mirrors, partly the mechanisms for the reversing of the movement of the mirrors, and partly a locking device for the reversing mechanism. Fig. 1* represents a modification in the relative positions of the parts.

The same numerals of reference indicate the same parts in the different figures.

Figure 20:
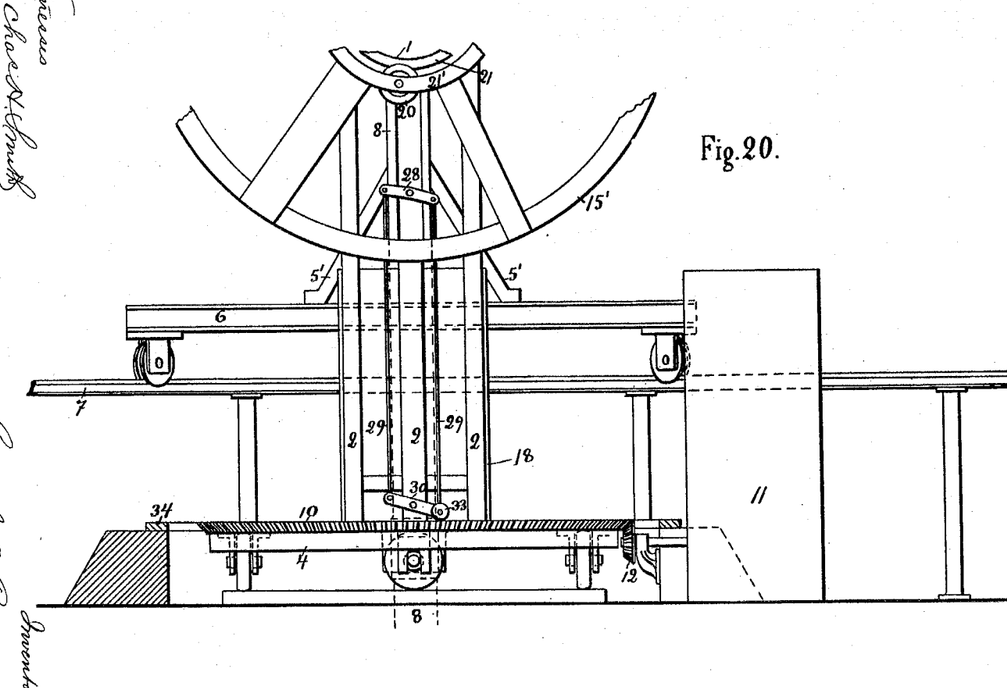
Fig. 20 is a section of the apparatus similar to that shown in Fig. 3, but with the difference that the apparatus is supported by a turn-table.

1 is the boiler in which the fluid is heated. The boiler consists of a horizontal cylinder and is supported by several supports 2 either from the tank 3, floating in water, or from the turn-table 4, Fig. 20. The boiler is supported at the ends by supports 5 and braces 5', projecting from beams 6, carried on wheels. Said wheels roll on a circular track 7, concentric to the vertical shaft 8 of the boiler. If the boiler is made very long, it may also be supported on one or several places between the ends and the middle of the boiler by supports movable on rails and arranged as those described before.

Figure 3:
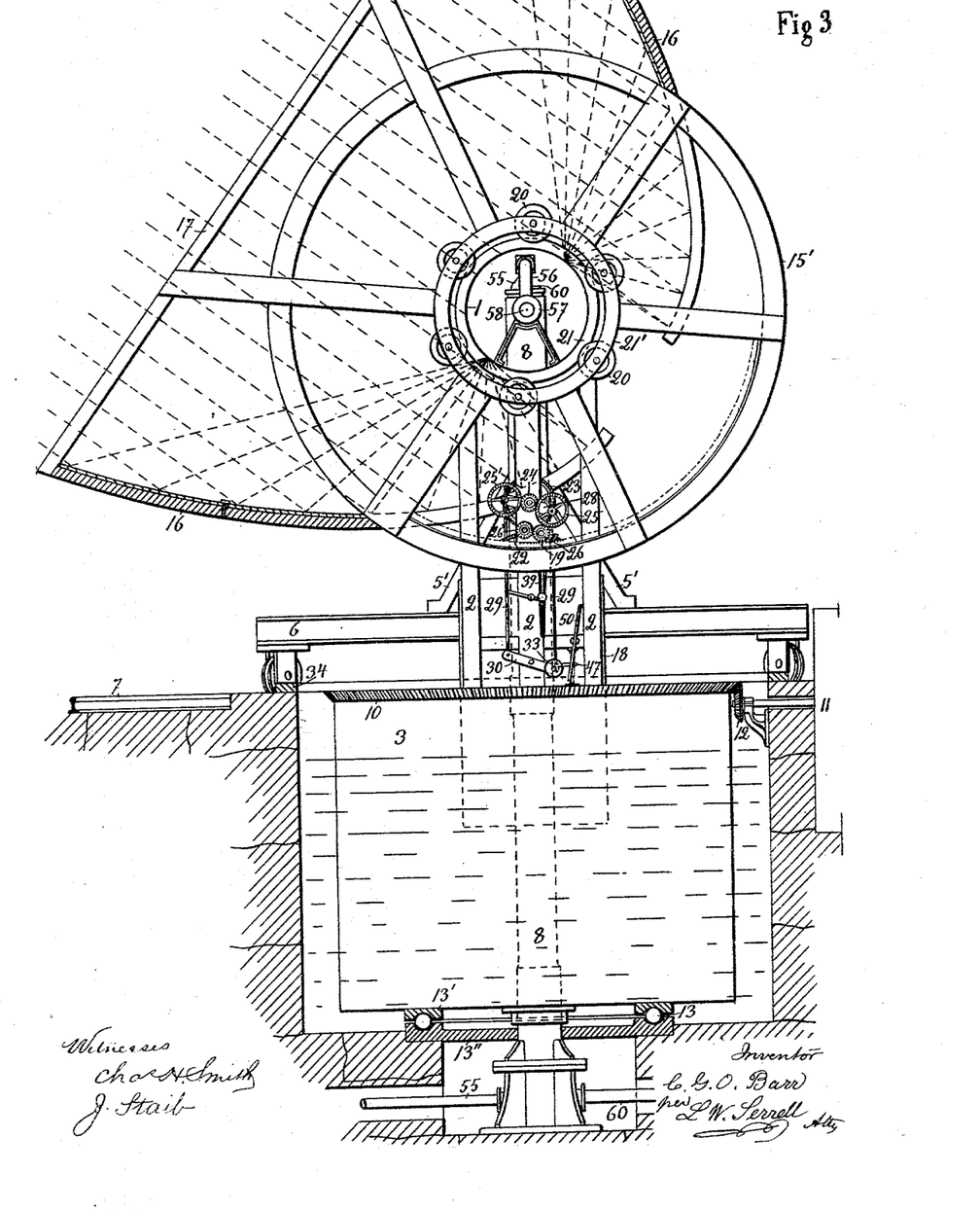
Fig. 3 is a section of the apparatus along the line A B in Fig. 1 and through the middle of the receptacle for the water, with the shank in elevation and the mirrors slightly turned.

The hollow shaft 8, which is steadily fixed on a suitable bed, extends through the middle of the tank 3, Fig. 3, (or through the middle of the turn-table 4, Fig. 20,) and enters with its upper end into the boiler 1. Stuffing-boxes 9 tighten round the shaft 8 at the bottom of the tank 3 and at the boiler 1. At the upper rim of the tank (or at the turn-table) is attached a toothed ring 10, in which engages a driving-wheel 12, kept in motion by the clockwork 11 in order to rotate the tank (or turn the table) and the boiler round the shaft 8.

In order to reduce the friction that may occur between the tank 3 and the bottom of the reservoir for the water, the tank may be supported by balls 13, that are placed between a ring 13', hollowed out and affixed to the bottom of the tank 3 and a circular groove on a plate 13'', which serves as cover of the pit in which the base of the shaft 8 stands.

Figure 4:
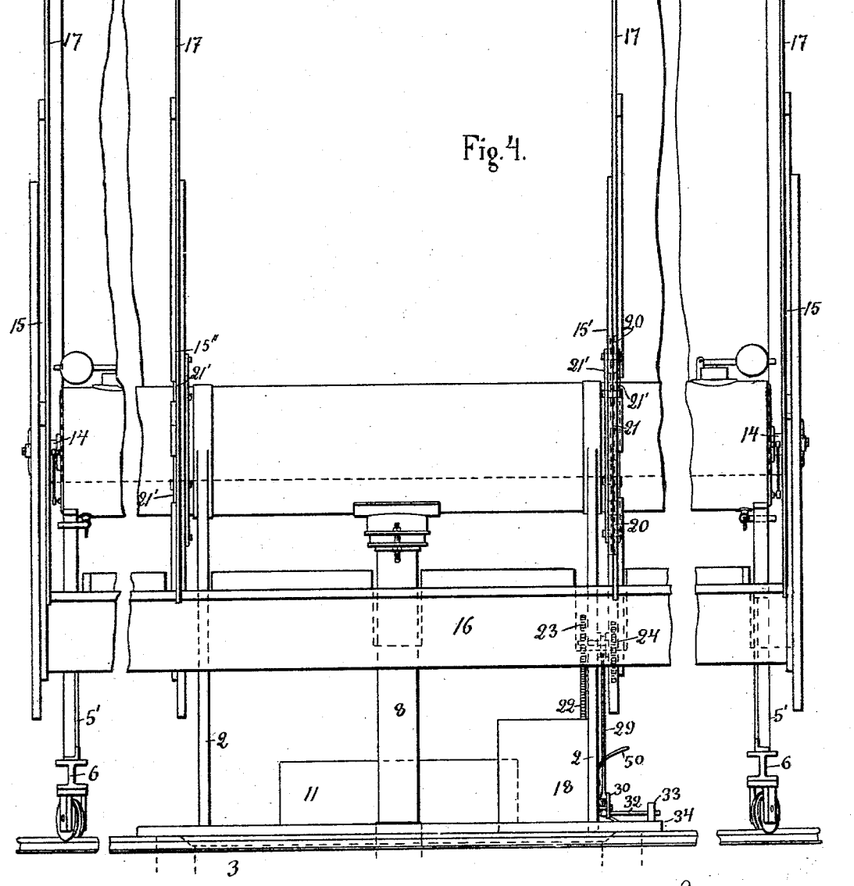
Fig. 4 is a front elevation of the apparatus with the mirrors in the same position as in Fig. 3.
Figure 19:
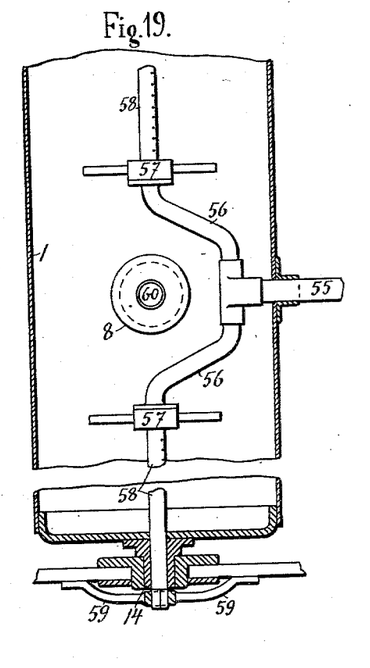

At the end walls of the boiler are affixed pivots 14, Figs. 4 and 19, on which are mounted wheels 15. The mirrors 16 are in any suitable manner attached to these wheels and supported by the same. To strengthen the mirrors, they are connected together by braces 17.

The movement of the mirrors 16 round the boiler is effected by means of a clockwork contained in the casing 18, placed on the tank 3. Said clockwork engages by a suitable gearing in a toothed segment 19, fixed to the mirrors. When the boiler is of considerable length, as in the example shown, said segment 19 may advantageously be fixed to a wheel 15', Fig. 3, similar to the wheel 15. Said wheel 15' is in the arrangement shown supported by wheels 20, rolling on a projecting flange 21 or railway on the boiler and concentric to the boiler. The wheels 20 are journaled between two rings 21', fixed to the arms of the wheel 15'.

Figure 1:
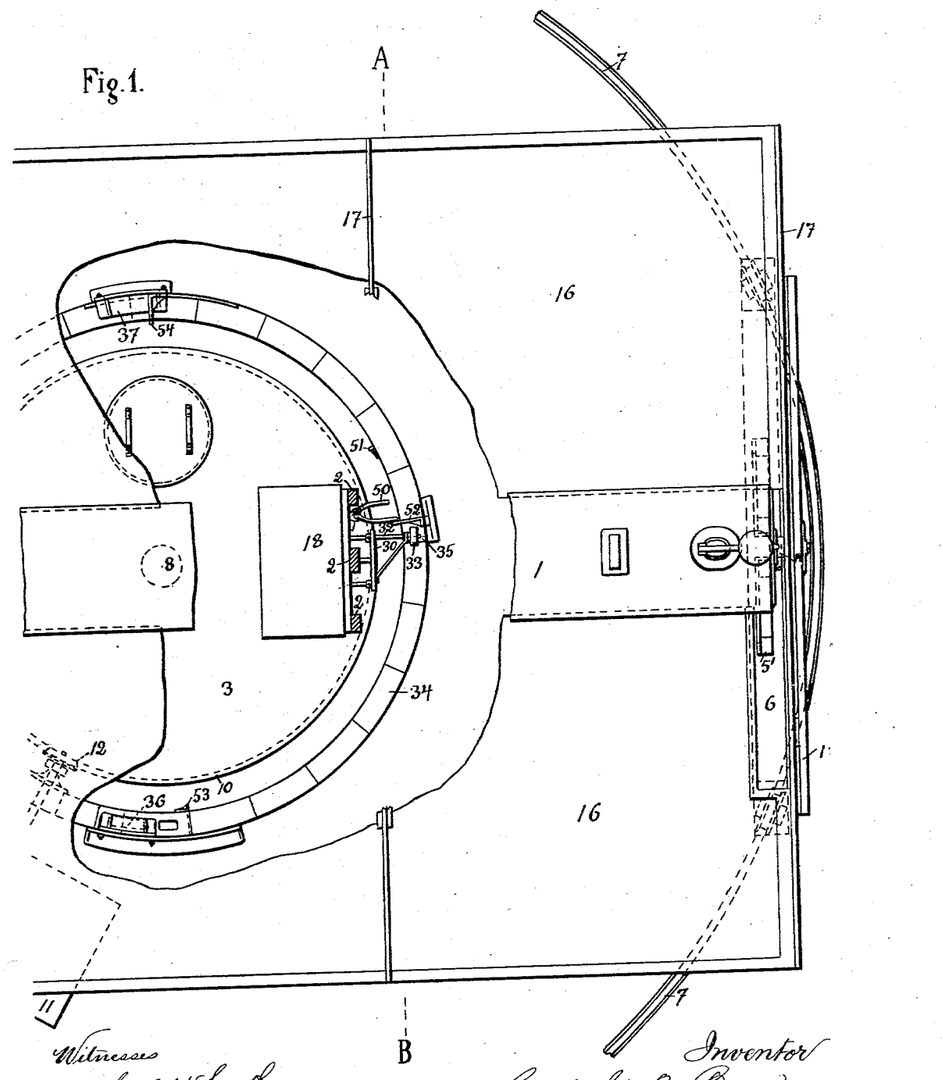
Figure 1 represents such an apparatus in elevation, with parts of the boiler and mirrors cut away so as to give a view of parts beneath.
Figure 2:
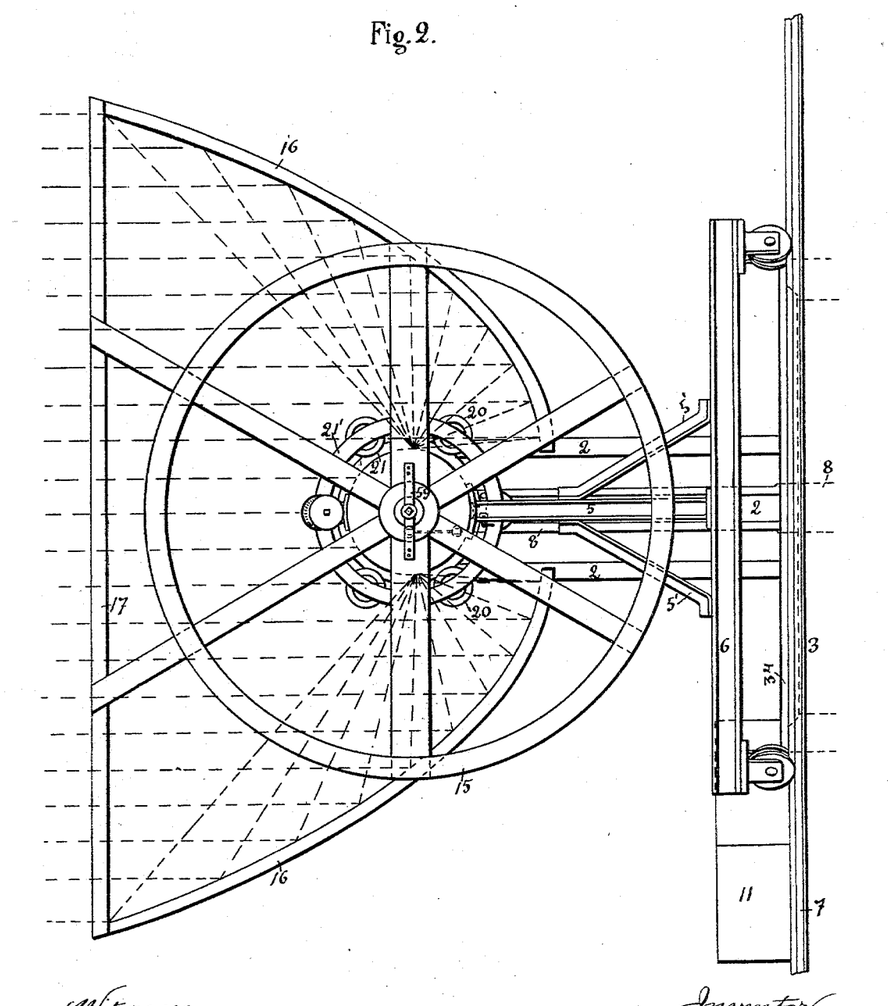
Figure 5:
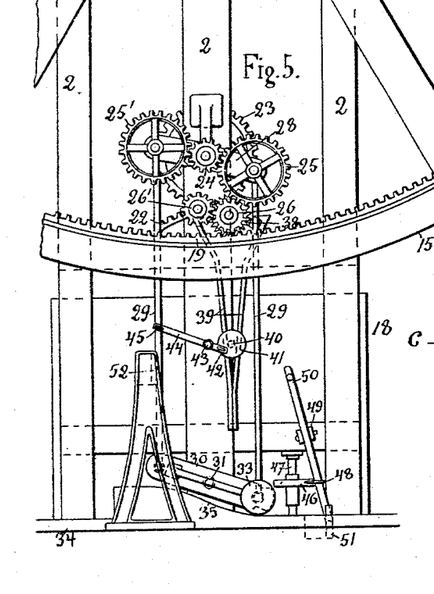
Fig. 5 is a front view, and Fig. 6 a side view, of said parts.
Figure 6:
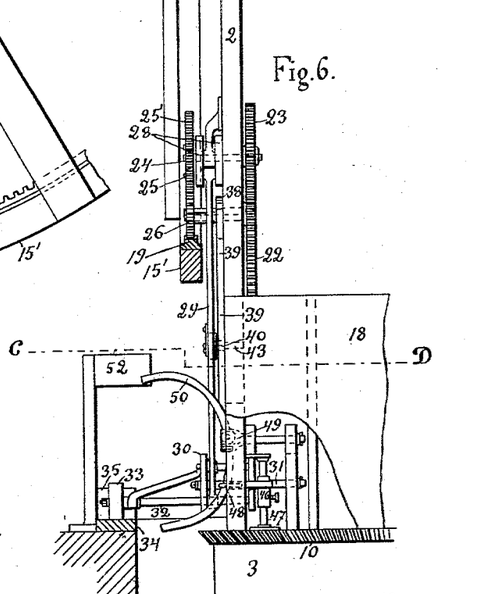
Figure 7:
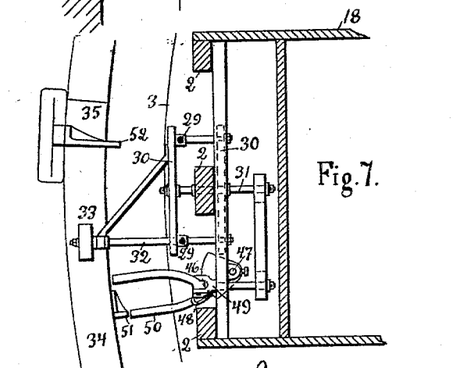
Fig. 7 is a horizontal section on the line C D in Fig. 6.
Figures 8, 9:
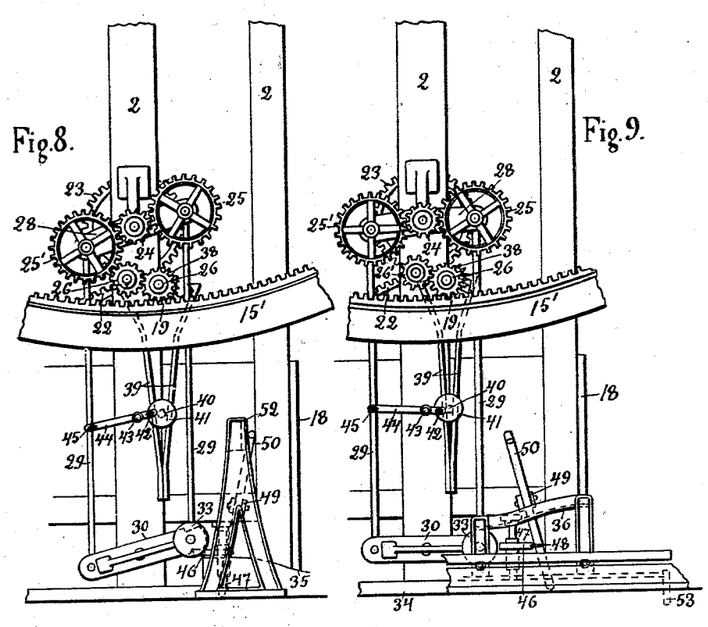
Figs. 8 and 9 are front views of other positions of the gearings and the reversing mechanisms and the locking device.
Figure 10:
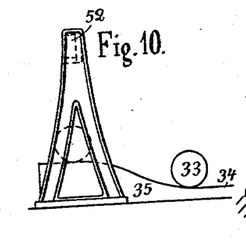
Figs. 10 and 11, 12 and 13, and 14 and 15 show, respectively, in front and side views the inclined planes, which are used for actuating automatically the reversing mechanisms, and the fixed stops, which serve to actuate the locking device of the reversing mechanism.
Figure 11:
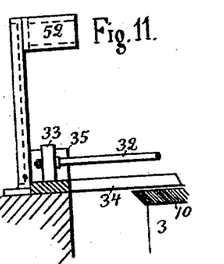
Figure 12:
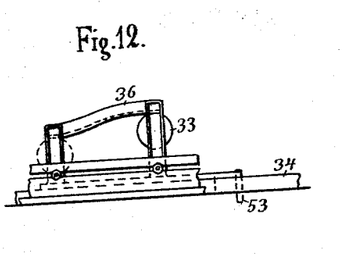
Figure 13:
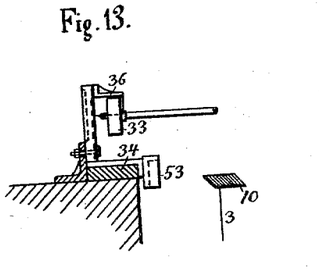
Figure 14:
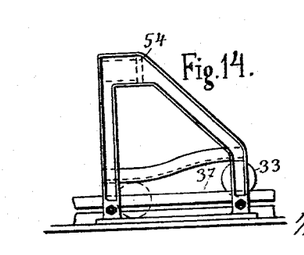
Figure 15:
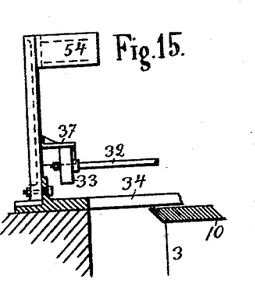

In order to keep the mirrors steady, as well as for counterbalancing the structure, another wheel 15'', Fig. 4, is provided symmetrically in relation to the shaft 8 and similar to that carrying the toothed segment and mounted in the same manner. By providing the wheels 15 and 15' and 15'' with suitable weights the mirrors may be accurately balanced. The gearing between the clockwork and the toothed segment 19 consists of the following toothed wheels, (see Figs. 5, 6, 8, and 9:) A wheel 22, driven by the clockwork, engages with a wheel 23, mounted on one of the supports 2, and on the shaft of this wheel 23 is fixed a pinion 24, engaging with two wheels of the same size 25 25', of which 25 is in Figs. 3 and 5 shown in gear with a pinion 26. Said pinion 26 is in gear with another pinion 26', of the same diameter as 26, and also with the toothed segment 19, fixed to the wheel 15'. In order to (by means of the gearing set forth) reverse the direction of the movement of the mirrors at noon and stop the mirrors in the evening, as well as set the mirrors going again in the morning, the cog-wheels 25 25' are mounted on the ends of a balance 28, loosely mounted on the shaft of the cog-wheel 23 in such a manner that by rotating said balance 28 to the position shown in Fig. 9 the cog-wheel 25 is brought out of gear with the pinion 26, and by rotating the balance 28 farther to the position shown in Fig. 8 the wheel 25 is brought in gear with the pinion 26'. Said rotation of the balance 28 is effected automatically by means of the following devices during the rotation of the boiler:

Right below the balance 28 and loosely mounted on a shaft 31 near to the top of the tank 3 is another balance 30. (See Fig. 7.) The two balances are connected by link-rods 29. From the one end of the balance 30 projects a short shaft 32, the outer end of which carries a roller 33. Said roller passes, during the rotation of the boiler 1, along a circular path 34, concentric to the shaft 8, and serving as dial-plate. On this path an inclined plane 35, Figs. 5, 8, 10, and 11, is fixed on the point above which the roller 33 is at noon. Besides, the path is provided with two movable inclined planes 36 37, Figs. 9 and 12 to 15, of which 36 is fixed at that point of the path where the roller 33 is at sunset and 37 at the point where the roller is at sunrise. (See Fig. 1.)

The inclined planes act in the following manner: As the roller 33 arrives to the inclined plane 35—that is to say, at noon—it is compelled to move upward by the incline, and thereby the balance 30 is turned round the shaft 31, and consequently by means of the rods 29 the balance 28 also is turned round the shaft of the cog-wheel 23, so as to disengage the wheel 25, Fig. 5, from the pinion 26. The height of the inclined plane 35 is so adjusted that the roller 33, having arrived to its top, (the dotted position in Fig. 10,) the balance 28 is turned enough to bring the wheel 25' in gear with the pinion 26'. Then the pinion 26 and the wheel 15' are rotated in opposite directions. When the roller 33 in the evening comes to the inclined plane 36, Figs. 12 and 13, the top of which is on a level with or a little higher than the top of the incline 35, the roller 33 is by means of said incline 36 carried downward to a middle position between its highest position given by the incline 35 and its lowest position, (the position in Fig. 9 and the dotted position in Fig. 12.) In this position of the roller 33 the wheel 25' is also brought out of gear with the pinion 26', and thus the gearing between the clockwork 21 and the wheel 15' is interrupted. In consequence thereof the movement of the mirrors is arrested and the mirrors remain in the position given till the following morning, when the roller 33 comes to the inclined plane 37, Fig. 15, the top of which is on a level with or a little higher than the lowest part of the incline 36, and is carried down to the path 34, (the dotted position in Fig. 14.) The wheel 25 is then again brought in gear with the pinion 26 and the mirrors are set going.

In order to prevent the mirrors from continuing their movement in consequence of their inertia, or from being displaced by any other force, when the movement of the mirrors is reversed at noon or arrested at sunset there is a ratchet-wheel 38 connected with the pinion 26 and two spring-pawls 39 pressing against said ratchet-wheel. Between the pawls there is a rotating stud 40, square in section, to which is fixed a disk 41, provided with a pin 42, that enters in a longitudinal slot in the one end of a lever 44, pivoted at 43. The other end of said lever 44 is also provided with a slot in which enters a pin 45, fixed to one of the link-rods 29. When one of the wheels 25 or 25' engages with the corresponding pinion 26 or 26', thus occupying the position in Fig. 5 or Fig. 8, the stud 40 turns two opposite angles toward the pawls and keeps them out of gear with the ratchet-wheel 38; but when both of the wheels 25 25' are out of gear—that is to say, in the position shown in Fig. 9—or when the roller 33 is in its midposition the stud turns two opposite sides toward the pawls, and the pawls are then pressed between the teeth of the ratchet-wheel 38 and the mirrors are kept fixed or arrested during the time the direction of the movement is reversed at noon and also during the night.

In order to keep the wheel 25 or 25' in gear with the pinion 26 or 26' the following device is provided: Near the one end of the inner part of the balance 30 is a locking-disk 46, fixed to a vertical shaft 47 and provided with a loop-piece 48, surrounding one of the legs of a U-shaped rod 50, pivoted in the forked end 49 of a horizontal shaft 49'. The locking-disk 46 is so located in relation to said balance 30 that it can place itself close over or close under the suitably-formed end of the balance when this balance is in its highest or lowest position—that is to say, when the wheel 25 or 25' is in gear with the pinion 26 or 26'. At the inclined plane 35 there are two fixed stops 51 52. The first stop 51 is located a little in front of the incline near the path 34 and in the way for the lower leg of the U-rod. The second stop 52 is placed above the highest part of the inclined plane 35 and in the way for the upper leg of the U-rod. A little in front of the inclined plane 36 is a stop 53, preferably connected to the base of the incline and arranged in the same way as the stop 51, and above the inclined plane 37 a stop 54 is arranged in the same way as the stop 52. Assuming that the roller 33 approaches the inclined plane 35, and thus the wheel 25 in gear with the pinion 26, and that the locking-disk is over the end of the balance 30, as in Fig. 3, the stop 51 is then to be so located that it, during the movement of the boiler, turns the lower end of the U-rod 50 aside and thereby moves the locking-disk 46 from the balance before the roller 33 commences its upward movement along the inclined plane. (See Fig. 5.) At the same time as the lower end of the U-rod is moved aside it is drawn inward by the loop 48 of the locking-disk 46, so as to turn the U-rod in the fork 49 and push its upper end outward. The roller 33 having reached the top of the inclined plane 35, the upper end of the U-rod will strike against the stop 52 and is by said stop moved back to its former position. Thereby the locking-disk 46 is brought below the balance, Fig. 8. During this latter movement of the U-rod its lower end is carried outward by the locking-disk 46, so as to be able to strike the stop 53 in the evening. This stop 53 will bring the locking-disk from the balance again, Fig. 9, before the roller 33 is brought down in the midposition by the inclined plane 36. The U-rod and the locking-disk remain in this position until the following morning, when the roller 33 will first be brought down to its lower position, whereupon the U-rod will strike the stop 54 and bring the locking-disk back over the balance, and then the same sequence of movements is repeated.

The stops 51 and 52 as well as the inclined plane 35 are stationary, because the roller 33 will always be at the same point on the path 34 at noon in whatever place the apparatus may be set up. The stops 53 54 and the inclined planes 36 37 are, on the contrary, movable, so as to be adjusted according to the changes in the time of day for sunset and sunrise, in order to arrest the mirrors in due time in the evenings and to connect them with the clockwork in the mornings.

Figure 16:
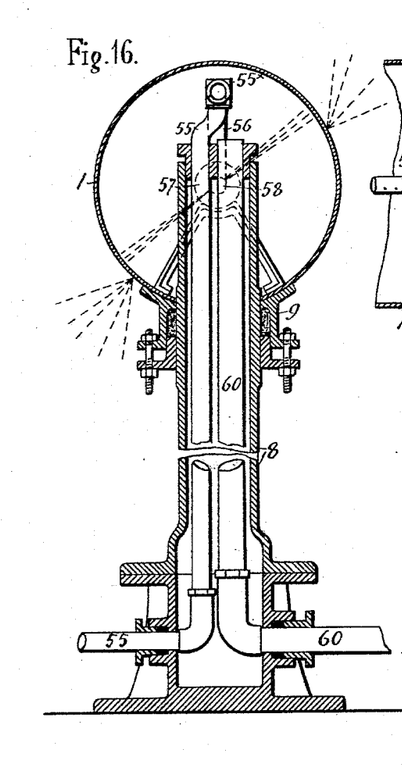
Fig. 16, which is a vertical section of the boiler and the central shaft entering the boiler, and Fig. 17, which is a vertical section of a part of the boiler, taken at right angles with that of Fig. 16, with the shaft in elevation, show an arrangement for supplying the water to and discharging the steam from the boiler.
Figure 17:
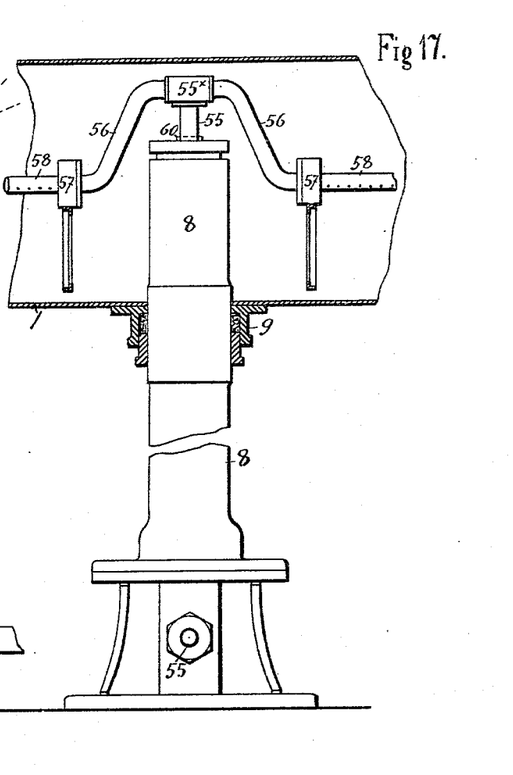
Figure 18:
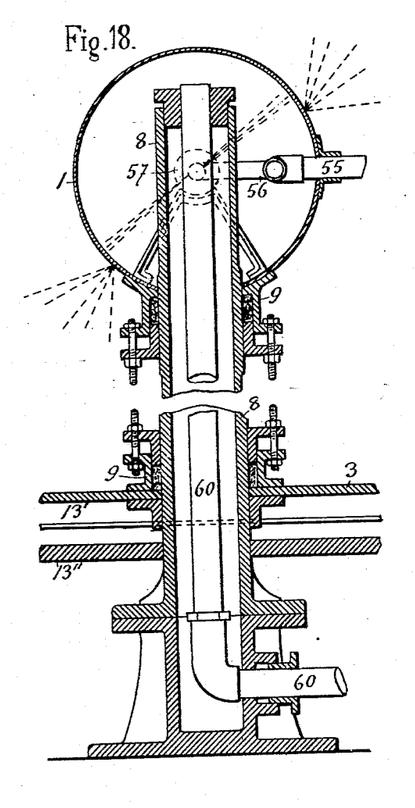
Figs. 18 and 19, the first a vertical section, and the latter a horizontal section, of the boiler, show another arrangement for the supplying of the water.

For supplying the boiler 1 with fluid, assumed to be water in the shown example, a feeding-pipe 55 is introduced in the lower part of the shaft 8, Figs. 3, 16, and 17, and extends through the shaft into the boiler and is there in a movable way connected to two branches 56 56, one at each side of the shaft. At the ends of those branches 56 are connections 57, supported from the boiler. In those connections 57 are longitudinal tubes 58, journaled, and said tubes extend along the boiler and fit tightly in the pivots 14, which are for this purpose made hollow. Stuffing-boxes may be arranged, if necessary. In Figs. 18 and 19 the feeding-pipe 55 enters the side of the boiler and is assumed to communicate by a hose (not shown) with the water, in which the tank 3 floats. The tubes 58 are closed at their outer ends and terminate with a square clasped by a bridge-piece 59, fixed to the wheels 15. By this arrangement the tube 58 will follow the movement of the mirrors, and as the rows of holes are arranged in such a manner that the jets of water will impinge against the inner wall of the boiler a little above the parts of the same, against which the rays of the sun are reflected, the steam will be formed very quickly and under favorable conditions.

Instead of water compressed air may be used as motive fluid. The compressed air is suitably supplied in the manner described above for water, but instead of issuing out through perforations in the tubes 58 the air may be discharged into the boiler through openings in the tubes 58 near the end walls of the boiler. Water and compressed air may also be introduced simultaneously in the boiler, either mixed before the admission to the boiler or separately through suitable conduits.

The heated fluid is led away through the the suitably-insulated pipe 60 in the shaft 8.

From the above it is obvious that the boiler, and with it the mirrors, is turned so as to follow the apparent movement of the sun from east to west, the mirrors simultaneously following the movement of the sun toward and from the zenith. If the speed of these movements is regulated, which may be done by changing the speed of the clockworks 11 and 18 in known manner, the mirrors may be automatically so directed that the axes of the parabolas always pass through the sun on whatever place of the earth the apparatus will be erected.

In order to utilize the heat of the rays falling directly on the boiler 1 between the mirrors, lenses of the kind used in lighthouses, or so-called "Fresnel's" lenses, may be arranged on the wheels 15, 15', and 15'', or in any other way between the mirrors.

In order to prevent the escape of heat from the boiler through the parts of the same not being exposed to the rays of the sun, it is preferable to arrange a cover of felt or the like that may participate in the movement of the mirrors.

The boiler ought to be fitted with safety-valves, manometers, water-gages, &c., as in common boilers.

Having now described my invention, what I claim as new, and desire to secure by Letters Patent, is—

1. In an apparatus for heating a fluid by the rays of the sun concentrated by means of mirrors, the combination of a cylindrical boiler 1, and cylindro-parabolic mirrors 16, in halves of similar or dissimilar radius, so arranged that the distance between the focus-lines is equal to the diameter of the boiler, and so that the focus-lines are on the surface of the boiler, substantially as set forth.

2. In an apparatus for heating a fluid by the rays of the sun concentrated by means of mirrors, the combination of a horizontal cylindrical boiler 1, the longitudinal axis of which is kept perpendicular to the vertical plane through the sun and the zenith said boiler being movable in one and the same plane round a vertical hollow shaft 8, conduits 55, 60, in said shaft for feeding the fluid to be heated and for letting off the heated fluid, cylindro-parabolic mirrors 16, in two halves adapted to be turned upon the horizontal axis of the boiler and means for turning the boiler and the mirrors, substantially as set forth.

3. In an apparatus for heating a fluid by the rays of the sun concentrated by means of mirrors, the combination of the boiler 1, the tubular shaft 8 with its conduits, a floating reservoir 3 supporting the boiler, the mirror 16 and means for rotating the boiler and the mirror, substantially as set forth.

4. In an apparatus for heating a fluid by the rays of the sun concentrated by means of mirrors, the combination of the boiler 1, the shaft 8, with the conduit 60 for letting off the heated fluid, the floating reservoir 3, a conduit 55 from the boiler to the water in the tank surrounding the reservoir 3 and means for forcing the water through said conduit, the mirror 16 and means for rotating the boiler and the mirror, substantially as set forth.

5. In an apparatus for heating a fluid by the rays of the sun concentrated by means of mirrors, the combination of the boiler 1, the fixed shaft 8, with its conduits, the mirror 16, and a support for the boiler and mirrors and means for turning the parts round the axis of rotation for the boiler, substantially as set forth.

6. In an apparatus for heating a fluid by the rays of the sun concentrated by means of mirrors, the combination of the boiler 1, the shaft 8, with its conduits 55, and 60, the mirrors 16, means for supporting the boiler and the mirrors, a clockwork to rotate the boiler with the mirrors round the shaft 8, once in twenty-four hours and another clockwork to operate the mirrors only so as to follow the apparent movements of the sun, substantially as set forth.

7. In an apparatus for heating a fluid by the rays of the sun concentrated by means of mirrors, the combination of the boiler 1, the shaft 8, with its conduits 55, and 60, the mirrors 16, means for supporting and rotating the boiler with the mirrors, a clockwork for operating the mirrors only, and means for automatically giving the mirrors a suitable position in accordance with the apparent movement of the sun, substantially as set forth.

8. In an apparatus for heating a fluid by the rays of the sun concentrated by means of mirrors, the combination of the boiler 1, the shaft 8, the conduits 55 and 60, the mirror 16, means for supporting and rotating the boiler, a clockwork for operating the mirror, means for automatically reversing the movement of said mirror consisting of the pinion 24, the balance 28, the cog-wheels 25, 25', the pinions 26, 26', the toothed segment 19, the roller 33 on the balance 30 connected with the balance 28 by means of the bars 29 and the inclined plane 35, substantially as set forth.

9. In an apparatus for heating a fluid by the rays of the sun concentrated by means of mirrors, the combination of the boiler 1, the shaft 8, the conduits 55 and 60, the mirror 16, means for supporting and rotating the boiler, a clockwork for operating the mirror, means for automatically reversing the movement of said mirror, and means for automatically arresting and starting the movement of the mirror round the axis of the boiler in the evening and in the morning consisting of inclined planes 36, 37 in the track of any part of the balance 28 or 30, substantially as set forth.

10. In an apparatus for heating a fluid by the rays of the sun concentrated by means of mirrors, the combination of the boiler 1, the shaft 8, the conduits 55 and 60, the mirror 16, means for supporting and rotating the boiler, the clockwork and gearing for operating the mirror, and a device for arresting the pinions 26 and 26' and the toothed segment 19 at the reversing of the movement of these parts consisting of the fixed ratchet-wheel 38, the two spring-pawls 39, the square stud 40 between said pawls, the disk 41, the pin 42, the slotted lever 44, the pin 45 on one of the rods 29, substantially as set forth.

11. In an apparatus for heating a fluid by the rays of the sun concentrated by means of mirrors, the combination of the boiler 1, the shaft 8, the conduits 55 and 60, the mirror 16, means for supporting and rotating the boiler, the clockwork and gearing for operating the mirror, and a device for keeping the cog-wheel 25 or 25' in gear with the pinion 26 or 26' consisting of the locking-disk 46, the U-rod 50, the fixed stops 51 and 52, 53 and 54, substantially as set forth.

12. In an apparatus for heating a fluid by the rays of the sun concentrated by means of mirrors, the combination of the boiler 1, the shaft 8, the conduits 55 and 60, the mirror 16, means for supporting and rotating the boiler, the clockwork and gearing for operating the mirror, the arrangement for distributing the fluid in the boiler, consisting of the tubes 58 in the connection with the conduit 55, the two rows of holes along the tubes 58, and the bridge-pieces 59 connecting the tubes with the mirror, substantially as set forth.

In testimony whereof I have signed my name to this specification in the presence of two subscribing witnesses.

CARL GOTTFRIED OLSSON BARR.

Witnesses:
ARV ARVEDSOM,
HUGO UFER.